United States Patent

Townsend

[15] 3,660,249
[45] May 2, 1972

[54] METHOD AND APPARATUS FOR DETERMINING BOTH THE AVERAGE CORROSION RATE, AND THE PITTING TENDENCY, SUBSTANTIALLY INDEPENDENTLY OF THE RESISTANCE OF THE ELECTROLYTE

[72] Inventor: Clarence R. Townsend, Anaheim, Calif.
[73] Assignee: Magna Corporation, Sante Fe Springs, Calif.
[22] Filed: Feb. 5, 1970
[21] Appl. No.: 8,809

[52] U.S. Cl. .............................. 204/1 T, 204/195, 324/71 C
[51] Int. Cl. ....................................................... G01n 27/26
[58] Field of Search ..................... 204/195 C, 1 T; 324/71 C

[56] References Cited

UNITED STATES PATENTS

| | | | |
|---|---|---|---|
| 3,069,332 | 12/1962 | Seyl | 204/1 T |
| 3,250,689 | 5/1966 | Seyl | 204/1 T |
| 3,207,678 | 9/1965 | Marsh et al. | 204/1 T |
| 3,331,021 | 7/1967 | Marsh et al. | 324/71 |
| 3,398,065 | 8/1968 | Marsh | 204/1 T |
| 3,406,101 | 10/1968 | Kilpatrick | 204/1 T |

OTHER PUBLICATIONS

T. M. Doniguian, " The Continuous Recording of Instataneous Corrosion Rates," paper presented at the 1966 Annual Conference of the National Association of Corrosion Engineers, (1966).

Primary Examiner—G. L. Kaplan
Attorney—Gausewitz & Carr

[57] ABSTRACT

The method makes use of three electrodes which are exposed to the corrosive environment, the electrodes being the corroding or test electrode, the reference electrode, and the auxiliary electrode. The corroding electrode is made 10 millivolts positive relative to the reference electrode, and is then made 10 millivolts negative relative thereto. The anodic and cathodic currents which flow through a circuit including the corroding electrode and the auxiliary electrode are then averaged to produce an indication of the general or average corrosion rate, there being no substantial error due to the resistance of the electrolyte. The difference between such anodic and cathodic currents is determined in order to provide the pitting tendency or pitting index of the system. In accordance with a second embodiment of the method, the corroding electrode is forced to be at the same potential as that of the reference electrode. The current which then flows through a circuit including the corroding electrode and the auxiliary electrode is measured by a microammeter and is the pitting tendency of the system. Thereafter, the microammeter is caused to read zero despite the fact that current is passing therethrough, and the corroding electrode is forced to be at a 10 millivolt potential difference from the reference electrode. The reading of such microammeter is then directly proportional to the general or average corrosion rate.

20 Claims, 6 Drawing Figures

INVENTOR.
CLARENCE R. TOWNSEND
BY Jamewitz & Carr
ATTORNEYS

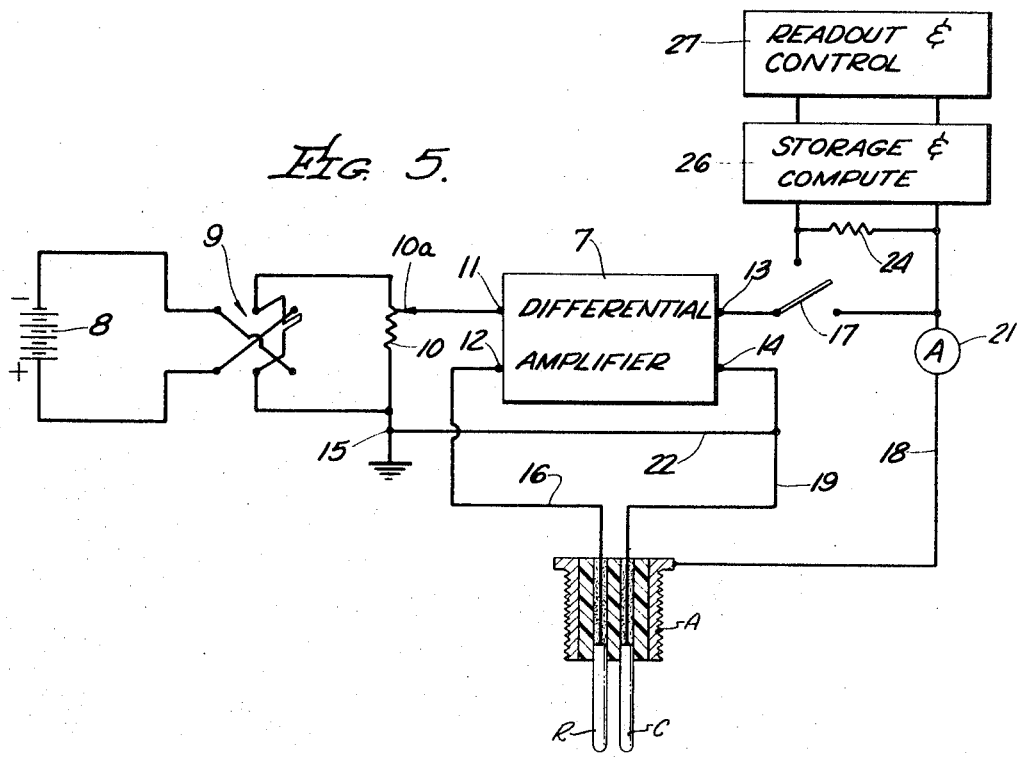

METHOD AND APPARATUS FOR DETERMINING BOTH THE AVERAGE CORROSION RATE, AND THE PITTING TENDENCY, SUBSTANTIALLY INDEPENDENTLY OF THE RESISTANCE OF THE ELECTROLYTE

The apparatus of the invention comprises reference and corroding electrodes made of the same metal, and an auxiliary electrode which is preferably the housing of the probe in which the reference and corroding electrodes are mounted. A differential amplifier is provided, and the output terminals thereof are connected respectively to the auxiliary electrode and to the corroding electrode. One input terminal of the amplifier is connected to the reference electrode, whereas the other input terminal is connected to a voltage source such that the 10 millivolt potential difference will be generated between the reference and corroding electrodes. A microammeter is provided to measure the current in the output circuit of the amplifier. In a second embodiment, means are provided to cause the reference electrode and the corroding electrode to be at the same potential during a portion of the test procedure, and means are provided to adjust the zero setting of the microammeter.

BACKGROUND OF THE INVENTION

1. Field of the Invention

This invention relates to the instantaneous determination of corrosion rates of metals, such as steel, etc., which are exposed to corrosive liquids in various types of industrial systems, oil field equipment, etc. The word "instantaneous" is a word of art and comprehends determinations which require a period of minutes.

2. Description of the Prior Art

Two-electrode methods and apparatus for determining the instantaneous general or average corrosion rate, and the pitting tendency have been employed for years by the assignee of the present application, namely Magna Corporation, 11808 South Bloomfield Avenue, Santa Fe Springs, California 90670, relative to its "Corrater" corrosion rate measuring instruments. One of such instruments is described in Magna Bulletin 741 relative to Model 1180, which automatically maintains the applied potential by means of a differential amplifier. Such "Corrater" instruments make use of teachings of Seyl, U.S. Pat. Nos. 3,069,332; 3,156,631; and 3,250,689; and also of Marsh, U.S. Pat. No. 3,398,065.

In Horner, U.S. Pat. No. 3,361,150 the following statements are made (column 11, starting at line 63 ):

"Actually, the corrosion reading obtained for one polarity may differ from that obtained in the other polarity. The difference results from certain effects at the electrode interfaces which are directly related to the pitting tendencies in the system. By reversing the polarity, as it is done here, the actual corrosion rate is more accurately obtained by taking the average between two successive readings. In addition, the pitting tendency is itself recorded as the difference between two successive readings."

The two-electrode methods of measuring average corrosion rate, and pitting tendency, have the advantage of simplicity, and have eliminated the need for a voltmeter except for calibrating purposes. However, such two-electrode systems have the disadvantage that the readings are not substantially independent of the resistance of the electrolyte in which the electrodes are immersed. It has therefore been necessary to relate the readings to graphs or other data which make appropriate corrections for the resistance of the electrolyte. This is particularly disadvantageous where the electrodes are immersed in an electrolyte the resistance of which varies substantially over a period of time.

The above-cited Marsh, U.S. Pat. No. 3,398,065 describes in columns 2–3 the "polarization resistance" method of obtaining corrosion rates, which method employs three electrodes. Such Marsh patent also describes (column 4, starting at line 52 ) the potential drop due to the resistance of the electrolyte, and further describes a four-electrode method of minimizing this error.

Kilpatrick, U.S. Pat. No. 3,406,101 recites much of the above and other prior art, and also refers (column 4, lines 41 et seq.) to the disadvantage caused by the IR drop when two-electrode methods are employed. Such Kilpatrick patent, and/or one or more of the above-cited Seyl patents, describe a three-electrode method whereby the potential of the corroding electrode in the three-electrode system is shifted a certain number of millivolts (for example, 10) from its own open circuit potential. The current which is necessary to create such shift in potential is then read in order to indicate the general or average corrosion rate. As the first step in the method described by Kilpatrick, the current is set at zero (column 6 of Kilpatrick, starting at line 70). Kilpatrick ignores the information which is inherent in the open circuit potential, particularly relative to the pitting tendency of the system. In addition, the Kilpatrick method requires the use of a high impedance voltmeter 30 for each test operation (not merely for calibrating as at the factory). Also, Kilpatrick makes use of three dimensionally identical electrodes as shown in FIG. 3 and described in column 6, starting at line 22.

There exists a very distinct need for a system of making instantaneous determinations of both the general or average corrosion rate and the pitting tendency, by means of a three-electrode system which: (a) may be employed substantially independently of the resistance of the electrolyte, (b) does not require a voltmeter except for calibration as at the factory, and (c) makes use of extremely simple two-prong probes which may be the same probes as employed in the prior-art two-electrode systems. In the latter connection, it is emphasized that two-electrode probes have previously been built into various systems by various customers and that readings are taken by temporarily connecting electrical circuits to such probes. It is therefore a significant consideration that the new three-electrode system be able to use these existing probes so that the customers will not have to replace the probes when shifting from the two-electrode to the three-electrode system.

SUMMARY OF THE INVENTION

In accordance with the present invention, the same or similar probes which have previously been used for two-electrode measurements of instantaneous corrosion rate and pitting tendency are used in a three-electrode system, the housing of the probe being used as a third electrode. Because the system is of the three-electrode type, the readings are substantially independent of the resistance of the electrolyte, yet the system has many of the simplicities inherent in the two-electrode system — for example the lack of a need for a voltmeter except during calibration as at the factory. It is extremely important that the present method and apparatus determine not only the general or average corrosion rate but also the pitting tendency, the latter frequently being more important to users of industrial equipment than is the general or average corrosion rate.

A first embodiment of the method of the invention involves causing the corroding (test) electrode to be at a potential which is either a predetermined amount positive or a predetermined amount negative relative to a reference electrode, by passing a polarizing current between the corroding (test) electrode and an auxiliary (counter) electrode. The amount of polarizing current necessary to achieve the predetermined potential difference is then read. Thereafter, the indicated steps are repeated except that the polarity is reversed. The average of the currents which are thus read is determined and is directly proportional to the average or general corrosion rate of the corroding electrode in the particular corrosive environment in which it is immersed. The difference between currents is the pitting tendency of the system. The apparatus employed to perform such first embodiment of the method includes a differential amplifier associated with a probe which may be the same as a conventional two-electrode probe. Such probe has a tubular housing which may be threaded into the wall of a vessel or pipe containing the electrolyte, and two electrodes mounted within the tube in sealed relationship and protruding into the corrosive environment. The apparatus may also include circuitry for determining the average and the difference automatically, and for providing a control function in response to either or both of the pitting tendency and average corrosion rate.

In accordance with a second embodiment of the method of the invention, the corroding electrode is first forced to be at the same potential as that of the reference electrode, following which the current which flows in a circuit including the corroding electrode and the auxiliary electrode is read and represents the pitting tendency. The next step in the method comprises compensating the ammeter which read such current in order to make the ammeter read zero despite the passage of the pitting current therethrough. The third step in the method comprises forcing the voltage of the corroding electrode to be a predetermined potential difference from the voltage of the reference electrode, and then noting the current flow on the above-indicated compensated meter. The indication on the compensated meter is directly proportional to the general or average corrosion rate. The apparatus employed to perform such second embodiment of the method includes the differential amplifier and the probe of the first embodiment, and additionally includes means (including a switch) to selectively connect the corroding electrode to one input of the differential amplifier, and means to compensate the ammeter in order that it will read zero despite the passage of pitting current therethrough.

The predetermined potential difference referred to in the two preceding paragraphs is normally 10 millivolts, although this amount may be varied (as stated hereinafter) for various metals and may even be varied for the same metal, the purpose being to maintain the reading on the linear portion of the polarization curve.

BRIEF DESCRIPTION OF THE DRAWINGS

FIG. 5 is a schematic diagram illustrating apparatus constructed in accordance with a first embodiment of the invention; and FIG. 6 is a diagram representing apparatus constructed in accordance with a second embodiment of the invention.

DETAILED DESCRIPTION OF THE PREFERRED EMBODIMENTS

Throughout this specification and claims, it is to be understood that the currents are not read until they have stabilized, for reasons well known in the art. The delay between application of the voltage and reading of the resulting current is normally between about one-half minute and about 2 minutes.

Figure 1:
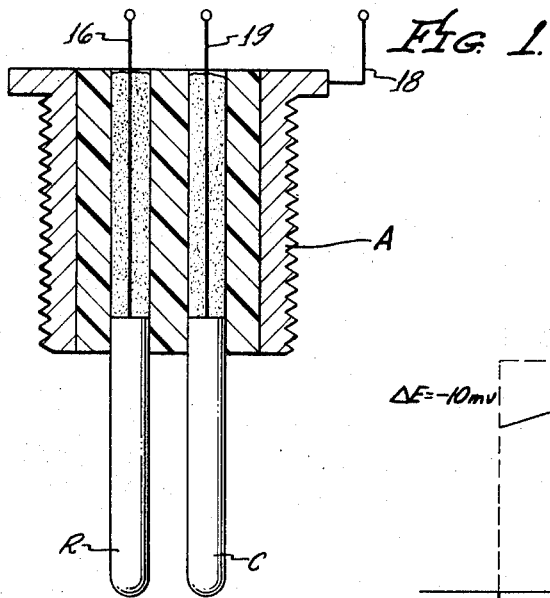
FIG. 1 is a cross-sectional view of a typical probe which may be employed in practicing the present invention.

Referring first to FIG. 1, a preferred probe for use in practicing the present method, and which may be incorporated in the present apparatus, is illustrated as comprising a tubular sleeve or housing A which constitutes the auxiliary or counter electrode. Such sleeve A contains a mass of epoxy resin or other electrically non-conductive sealant and in which are embedded the inner ends of the reference electrode R and the corroding (test) electrode C. Wires extend through the epoxy from the electrodes R and C for connection to the electrical apparatus to be described, and an additional wire is connected to the auxiliary electrode A.

The outer surface of the electrode sleeve A is threaded or otherwise adapted for mounting to the wall of a vessel or pipe which contains the corrosive environment relative to which the instantaneous determinations of corrosion rate and pitting tendency are to be made. The arrangement is caused to be such that all of the electrodes A, R and C contact the corrosive environment, such environment being electrically conductive and being normally liquid, namely an electrolyte. The word "electrolyte," as employed herein, denotes any corrosive environment which conducts electricity by means of ions, and includes not only liquids but also such environments as moist earth, etc.

The electrode A may be any size, shape and composition so long as it is an electrical conductor. The electrodes C and R are made of the same metal as each other, but they need not be of the same shape or size. The metal which forms the electrodes C and R is that metal relative to which the instantaneous determinations are to be made, being the same as the metal in the system under study (for example, the same as the metal which forms the wall of the vessel or pipe through which the sleeve A is extended).

As a specific example of the illustrated probe, the length of the exposed (not embedded in the epoxy) end of each of the electrodes C and R may be 1 ¼ inches, and the diameter of each such exposed end may be three-sixteenth inch. The spacing (on centers) between the electrodes C and R may be one centimeter.

The probe shown in FIG. 1 is the same type as is employed in the prior art relative to two-electrode systems, which creates a distinct advantage as indicated above in that probes now in use in the field may be employed for the three-electrode system instead of the two-electrode system. It is emphasized, however, that the present method and apparatus are not limited (except as specified in certain ones of the appended claims) to probes of the type wherein one of the electrodes is a sleeve and the others are mounted therein in insulated relationship. It is, for example, possible to practice the present method with three electrodes the shapes, sizes and spacings of which are different from that indicated above.

FIRST EMBODIMENT OF THE METHOD

The present method may best be described by comparing it to the prior-art three-electrode method, for example as taught by Kilpatrick U.S. Pat. No. 3,406,101 at columns 6 and 7. A purpose of such prior-art method (and one of the purposes of the present method) is to determine the polarization resistance which is present at the interface between the corroding electrode and the electrolyte in which it is immersed. Such polarization resistance changes with the corrosion rate, and does not change with the impressed voltage if the latter is sufficiently small (e.g., does not exceed 10 or 20 millivolts).

There is also a polarization resistance at the interface between the reference electrode and the electrolyte. In addition, the electrolyte has resistance. Both of these resistances are caused to be unimportant in the method, by the expedient of preventing passage of substantial current through the reference electrode. The reference electrode (instead of passing substantial current) serves to make contact with the electrolyte, and to permit potential to be measured in a circuit through which no substantial current is flowing. The auxiliary electrode, on the other hand, provides a terminus for the current which passes through the electrolyte from the corroding electrode.

The first step in the prior-art method (for example, as taught by columns 6 and 7 of Kilpatrick) is to eliminate all current flow to the corroding electrode (column 6, line 72 of Kilpatrick). Since there is then no current flow to or from the corroding electrode, the open circuit potential of the corroding electrode relative to the reference electrode may be determined by a voltmeter (column 6, line 74) or, more conventionally, may be nulled or compensated out (column 7, line 4) so that the voltmeter reads zero despite the fact that such open circuit potential is present.

The next step in the prior-art method is to pass sufficient current between the corroding and auxiliary electrodes (by impressing a voltage therebetween) that the desired small potential difference (such as 10 millivolts) will be indicated by the compensated voltmeter. The voltmeter being compensated as stated, the 10 millivolt potential difference exists relative to the open circuit potential of the corroding electrode (not the reference electrode).

The final step in the prior-art method is to measure the current flow which occurs (as stated above) between the corroding and auxiliary electrodes. Since the potential is known (e.g., 10 millivolts) and the current is known, the polarization resistance at the interface between the corroding electrode and the electrolyte could be determined by Ohm's law, and is inversely proportional to the corrosion rate. Actually, no determination of polarization resistance is made; since the current is directly proportional to the average or general corrosion rate the ammeter may be calibrated in terms of corrosion.

Figure 2:
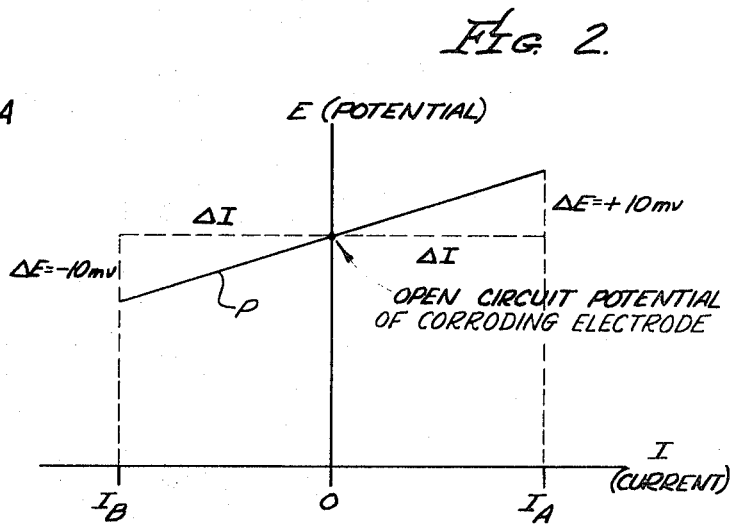
FIG. 2 is a diagram illustrating a three-electrode potentiostatic system of the prior art.

Referring to FIG. 2, there is illustrated the above-described three-electrode potentiostatic method of the prior art (for example, as taught by Kilpatrick, U.S. Pat. No. 3,406,101 at columns 6 and 7 ). In such diagram, and also in the diagrams of FIGS. 3 and 4, the x-axis represents the current I (between the corroding electrode and the auxiliary electrode) whereas the y-axis represents the potential E (between the corroding electrode and the reference electrode). The y-axis is located at the point of zero current, currents to the right thereof being positive and those to the left being negative.

The open circuit potential of the corroding electrode is, in FIG. 2, shown by the indicated point on the y-axis. Assuming that the impressed voltage was in the positive direction, the $\Delta E$ of 10 millivolts corresponds to a $\Delta I$ equal to $I_A$ (FIG. 2). Conversely, if the impressed voltage was negative, the $\Delta I$ is equal to $I_B$ (FIG. 2). It is emphasized that the $\Delta E$ is relative to the open circuit potential of the corroding electrode. The slope of the line P represents the polarization resistance at the interface between the corroding electrode and the electrolyte.

The described prior-art method does not measure the pitting tendency or index. Also, each operation of the prior-art method requires a voltmeter in addition to an ammeter.

The present method does not cause the $\Delta E$ to occur relative to the open circuit potential of the corroding electrode, as is the case in the prior art. Instead, the $\Delta E$ in the present method is caused to occur relative to the open circuit potential of the reference electrode. The present method does not ignore the information represented by the pitting current, but instead utilizes this information to produce the pitting tendency or index of the system.

Figure 3:
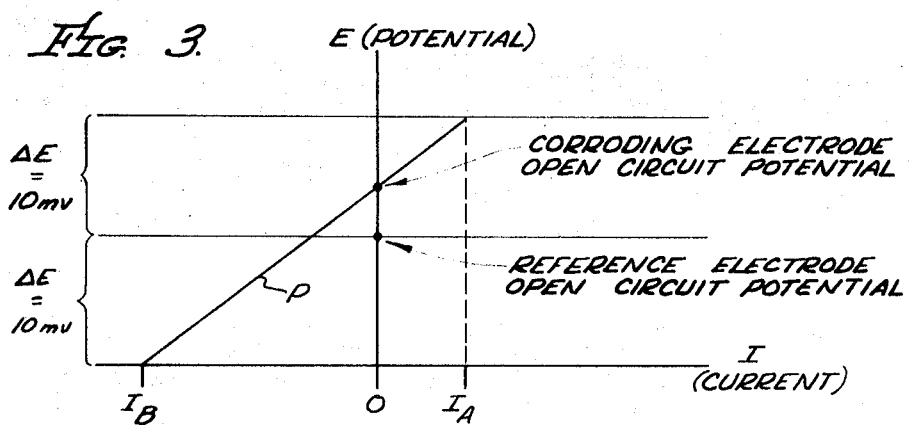
FIG. 3 is a diagram illustrating a mode of operation of the present method and apparatus.

The first embodiment of the present method will now be described with reference to FIG. 3 wherein the upper point on the y-axis is the open circuit potential of corroding electrode C, whereas the lower point on the y-axis is the open circuit potential of reference electrode R.

No currents are caused to be zero, and no voltmeters are required (once calibration has been effected as at the factory). The first step in the method is to apply a polarizing voltage between the corroding and auxiliary electrodes, which polarizing voltage is sufficiently great to create a polarization current sufficient to shift the potential of the corroding electrode a predetermined small amount (e.g., 10 millivolts) from the open circuit potential of the reference electrode. Because of factory calibration, this may be done by merely closing a switch. The small shift in potential is represented by $\Delta E$, and (if positive) corresponds to the current $I_A$ in the circuit including the corroding and auxiliary electrodes. After such current $I_A$ is noted, the applied polarizing voltage is reversed to produce the $\Delta E$ in the opposite direction (relative to the reference electrode), there then being a flow of current $I_B$.

The average of the current $I_A$ and the current $I_B$ is then computed, in order to determine the general or average corrosion rate. The current $I_A$ is regarded as positive (if current flow is in the expected direction based upon the impressed voltage), and the current $I_B$ is then also regarded as positive, and these two positive currents are added to each other and then divided by two in order to produce the average, which average is directly proportional to the general or average corrosion rate of the corroding electrode C in the system.

It is emphasized that the computed average is directly proportional to such general or average corrosion rate, without introduction of substantial error due to the resistance of the electrolyte to which the electrodes are exposed. This is because there is no IR drop in the circuit in which the potentials are measured. Since the average is substantially independent of the resistance of the electrolyte, it follows that an output or control voltage can be developed (as set forth below relative to elements 26 and 27 of FIG. 5) which will create a control effect or provide a readout substantially independent of the solution resistance.

As the next step in the present method, the difference between the two currents $I_A$ and $I_B$ is taken, disregarding sign if current flows in the expected direction based upon the impressed voltage, and is the pitting tendency or index of the system. Although such pitting tendency or pitting index does not yield direct data concerning metal penetration per unit of time, it has been found that the significance of the pitting data is of equal or even greater importance than the significance of the instantaneous general or average corrosion rate. For example, the larger the ratio between the pitting index and the general corrosion rate, the more penetrating the pit, while smaller ratios indicate pits of a broad or shallow nature.

When working in the linear polarization region with the classical operating technique of the prior art (FIG. 2), the positive and negative currents will be equal in most systems. In accordance with the present method, however, and as represented (for example) in FIG. 3, the positive and negative polarization currents will only be equal if the corroding and reference electrodes C and R have the same open circuit potential. Since, as illustrated in FIG. 1, such electrodes C and R frequently have the same size and shape, and always have the same composition, a question may arise as to how such electrodes can have anything other than the same open circuit potential.

The reference electrode R and the corroding electrode C can have different open circuit potentials in a pitting environment. Pitting, by definition, is non-uniform attack. It follows that one of the electrodes C and R will be attacked more than the other, resulting in more anodic sites (or having a greater anodic potential), and therefore the potentials of the electrodes C and R will be different. Because, in accordance with the present method, the corroding electrode C is polarized plus and minus a $\Delta E$ of 10 millivolts (or other predetermined amount as set forth below) from the potential of the reference electrode R, a greater current will be required to polarize the corroding electrode C in one polarity than in the other (FIG. 3). Thus, the present method provides pitting information from linear polarization data. This is an important advance, especially since many corrosion failures are due to pitting rather than from uniform metal loss (and which is indicated by the general or average corrosion rate).

As previously indicated, the voltage to which the corroding electrode C is polarized is preferably about 10 millivolts, particularly where the corroding electrode C and the reference electrode R are both formed of mild steel (for example, 1010 or 1020 steel). This is because a voltage of 10 millivolts is clearly within the linear region of the polarization curve for such metal. Even for mild steel, however, such voltage may be much higher or lower. It may be as high as 20 millivolts, but should not be much higher because non-linearity results. For metals other than mild steel, for example alloys, the voltage (in order to remain on the linear portion of the curve) may be 10 millivolts or may be more or less. For most alloys, the preferred voltages are in the range of about 3 millivolts to about 11 millivolts.

Figure 4:
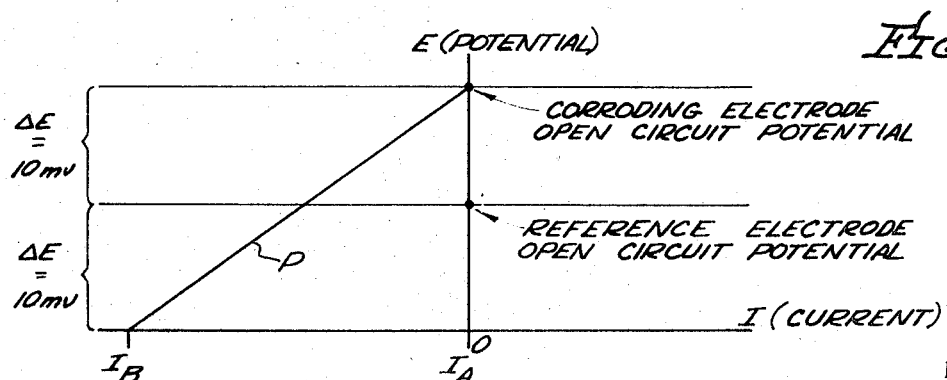
FIG. 4 corresponds to FIG. 3 but shows a special case wherein the open circuit potential of the corroding (test) electrode is 10 millivolts from the potential of the reference electrode.

Referring next to FIG. 4, which also refers to the first embodiment of the present method, a particular condition is illustrated wherein the open circuit potential of the corroding electrode C is 10 millivolts from the open circuit potential of the reference electrode R. Thus, the upper and lower points on the y-axis are 10 millivolts apart. In such special case, the current which flows in the circuit including the auxiliary electrode A and the corroding electrode C will be zero when the polarization voltage is applied in the direction to neutralize the open circuit potential. Thus, $I_A$ is zero in the special case of FIG. 4. However, the $I_B$ (which results from applying a polarization voltage of opposite polarity) is a greater distance from the y-axis. The result is that the slope of the line P which extends between the $I_A$ point and the $I_B$ point (which slope represents both the polarization resistance at the corroding electrode, and the corrosion rate) is identical in FIGS. 3 and 4, and that the determined polarization resistance (and thus the general or average corrosion rate) is the same. In the special case of FIG. 4, the pitting tendency is the current $I_B$, since the current $I_A$ is zero.

In accordance with the present method, the polarities or signs of the various currents are taken in the same manner as has been done relative to prior-art two-electrode methods such as those described in the references indicated above. Thus, unless there is a high degree of pitting, the current $I_A$ (FIG. 3) will be positive and the current $I_B$ will be negative, but (as indicated above) the negative sign is disregarded when the average is taken to determine the average corrosion rate and when the difference is taken to determine the pitting tendency or index. However, in those situations where the open circuit potential is so high (due to extreme pitting) that the current in the circuit through the corroding electrode C and the auxiliary electrode A is not in the expected or normal direction, but instead is the reverse thereof, then such current is taken as being negative when the general or average corrosion rate and the pitting tendency are determined. This would occur when the current $I_A$ is on the left side of the y-axis in FIGS. 3 and 4 instead of on the right side thereof.

FIRST EMBODIMENT OF THE APPARATUS

Referring next to FIG. 5, there is illustrated schematically the first embodiment of the apparatus of the invention, and which is particularly adapted to be employed in performing the first embodiment of the method as described under the previous subheading. The circuit of FIG. 5 comprises a differential amplifier 7 which includes its own power supply and which may be of various standard types now on the market. For example, the amplifier 7 may be a No. 709 differential amplifier manufactured by various companies including Motorola.

The differential amplifier 7 should have a very high input impedance, to minimize the current flow in reference electrode R. The amplifier should also have a high gain. A preferred amplifier, having a very high input impedance and a high gain, is Melcor Amplifier Model 1820, by Melcor Electronics.

It is a characteristic of such a differential amplifier that it will supply whatever current is necessary in order to make the two input terminals of the amplifier have an equal voltage. The current which is supplied by the differential amplifier to its output terminals comes primarily from the power supply in the amplifier, there being (as above noted) very little current flow through the input terminals.

The circuit of FIG. 5 also includes means to supply to amplifier 7 a predetermined D.C. voltage. Such voltage is adjusted (by calibration at the factory, or very infrequently in the field) in order to cause the voltage between the electrodes C and R to be the predetermined desired value (e.g., 10 millivolts).

The illustrated circuit for supplying the requisite D.C. voltage comprises a battery 8 which is connected through a reversing switch 9 to the winding 10 of a potentiometer. Thus, the voltage impressed on such winding 10 may be reversed by merely changing the position of the reversing switch.

The slider 10a of the potentiometer is connected to one input terminal 11 of the differential amplifier, whereas one end of the potentiometer winding is connected to a terminal 15 which is grounded as illustrated. The remaining input terminal 12 of the amplifier 7 is connected through a lead 16 to reference electrode R of the above-described probe or of an equivalent probe.

One output terminal 13 of amplifier 7 is connected through a selector switch 17 and a lead 18 to the auxiliary electrode A of the probe. The other output terminal of the amplifier is connected through a lead 19 to the corroding or test electrode C.

A microammeter 21 is connected in series with one of the amplifier output terminals 13 and 14 in order to indicate the current which flows through the circuit including the auxiliary electrode A and the corroding electrode C. The ammeter is thus in the external circuit means for impressing a polarizing voltage between C and A. In the illustrated embodiment, the microammeter is interposed in the lead 18.

Means, not shown, are provided to reverse the microammeter 21 when the polarity is reversed by means of switch 9. Alternatively, the microammeter may be of a center-reading type.

The output terminal 14 of the amplifier is grounded, for example by connecting the lead 19 to a lead 22 which extends to the grounded terminal 15.

When the above-indicated selector switch 17 is closed to its lower terminal, the output terminal 13 of the amplifier is connected to the lead 18 as described. The selector switch may also be closed to an upper terminal in order to cause a resistor 24 to be included in the output circuit of the amplifier. Such output circuit is then from terminal 13 through switch 17 and resistor 24 to lead 18, thence through electrodes A and C of the probe to lead 19, and thence back to the other output terminal 14.

A storage and compute circuit 26 is connected across resistor 24, so that the input of such circuit 26 is the voltage developed across the resistor 24 due to passage of current through the amplifier output circuit. The circuit 26 may be of numerous types adapted to compute first the average of the applied currents and then the difference therebetween, so that the information supplied to a readout and control means 27 will indicate either the general or average corrosion rate, and/or the pitting tendency, and/or the sum of the corrosion rate and the pitting tendency.

It is to be understood that the illustrated reversing switch 9 may be associated with the storage and compute circuit 26 in order that reversing will be effected automatically as desired. Instead of using the reversing switch 9, a reversing switch could be provided on the output side of the potentiometer.

In the operation of the circuit of FIG. 5, let it first be assumed that the selector switch 17 is closed to its lower position, and that the electrodes A, C and R are immersed in the electrolyte in the system under study. It is then merely necessary for the operator to close the reversing switch 9 to one position in order to effect flow of polarization current through the described circuit including the amplifier output terminals 13 and 14 and also including the electrodes A and C. Because of the described calibration, it is known that the voltage between corroding electrode C and reference electrode R will be equal to the desired predetermined value. Assuming (for example) that the slider 10a of the potentiometer is set at 10 millivolts relative to grounded point 15, the amplifier 7 will necessarily cause a potential difference of 10 millivolts between C and R. It is to be remembered that the amplifier will pass whatever current is necessary to cause the voltage at amplifier input terminals 11 and 12 to be the same. Since input terminal 11 is at 10 millivolts relative to point 15, input terminal 12 will also be at 10 millivolts. Therefore, and since terminal 12 is connected to R, and since C is connected to point 15 via leads 19 and 22, there will necessarily be 10 millivolts between C and R. This is true regardless of changes in various parameters, including the resistance of the electrolyte.

The polarization current is then read on ammeter 21, and the reversing switch 9 is shifted to its other position. The polarization current is again read, following which the operator takes the average of the two currents in order to determine the general or average corrosion rate. The difference between the two currents is then computed in order to determine the pitting tendency or index. The average is related to the actual corrosion rate in milli-inches per year, by means of a simple proportionality constant, this being because the present system operates independently of the resistance of the electrolyte.

Let it next be assumed that the selector switch 17 is closed to its upper position, so that the voltage generated across resistor 24 is related to the current flowing in the amplifier output circuit. The storage and compute circuit then reads and stores an indication of the current when the switch 9 is in one position, thereafter reads and stores an indication of the current when the switch 9 is in the opposite position, and then computes both the average of these two currents and also the difference therebetween. The data thus determined is delivered to the readout and control circuit 27 which may comprise a meter calibrated directly in terms of mills per year corrosion rate (instantaneous), and which indicates also the pitting tendency. Instead of a meter, the output may be indicated, for example, on a strip chart recorder.

Switch means (not shown) are provided to permit readout to be in terms of corrosion rate only, pitting tendency only, or alternate automatic readout of corrosion rate and pitting tendency (for example, on a time basis of three to one). If the output is on a strip chart recorder, the time ratio may be such that the recorder trace will be a series of dashes for general or average corrosion rate, and a series of dots for pitting tendency. The automatic means (not shown) for reversing the switch 9 may be operated at any desired time cycle, for example one at any point between 0.5 minute and 3.0 minutes.

The control portion of the readout and control means may include an alarm, means to start or stop an inhibitor pump, etc.

SECOND EMBODIMENT OF THE APPARATUS AND OF THE METHOD

It has been conventional, with two-electrode methods and apparatus for determining instantaneous average corrosion rates and pitting tendencies, to effect a reversal of the applied voltage in order that current would flow sequentially in opposite directions through the electrolyte. In accordance with the apparatus and method described below, no reversing is necessary. Furthermore, a direct readout of both the general or average corrosion rate and the pitting tendency is obtained in the absence of any storage and computing circuitry. In addition, there is no possibility that a mistake will be made due to use of the incorrect sign relative to any current.

Except as specifically stated, the circuit of FIG. 6 is identical to that of FIG. 5. Accordingly, the same reference numerals have been applied to corresponding elements in FIGS. 5 and 6.

The reversing switch 9 is omitted in FIG. 6, the ends of the potentiometer winding 10 being instead directly connected to the positive and negative terminals of battery 8. The storage and compute circuit 26 and the readout and control circuit 27 are not illustrated, but may in some cases be provided if desired in order to perform special functions.

A microammeter 31 is provided in lead 19, in series with the output terminal 14 of differential amplifier 7. However, as stated above relative to microammeter 21, the microammeter 31 could instead be connected in lead 18. Ammeter 31 is not a center-reading ammeter but instead has the zero current indication at one end of the scale.

Means are provided in association with the microammeter 31 to cause the reading thereof to be zero despite passage of current therethrough. Such means may comprise an adjustment (for example, mechanical) on the microammeter itself. Alternatively, and as schematically represented in FIG. 6, a zero-set circuit 32 may be provided in order to effect flow through ammeter 31 of a current which is equal and opposite to the current flowing therethrough from amplifier 7. Such currents therefore counterbalance each other and produce a zero reading on the scale of the microammeter. The zero-set circuit 32 may incorporate its own D.C. power supply or it may be associated with the power supply for amplifier 7.

A lead 33 is connected at one end to the input terminal 11 of differential amplifier 7 (that is to say it is connected to the lead which extends between slider 10a and such input terminal 11). The other end of lead 33 is connected to lead 19 at a point between ammeter 31 and electrode C. A switch 34 is incorporated in the lead 33 in order to open and close the circuit therethrough.

Stated generally, the second embodiment of the method comprises forcing the potential of the corroding electrode C to be equal to that of the reference electrode R, and then measuring the current which flows in the circuit including corroding electrode C and the auxiliary electrode A. Such current is the pitting index or tendency of the system and may be termed the pitting current.

The pitting tendency or index is that current which results form the open circuit potential difference between the reference and corroding electrodes, as distinguished from that current which results from any impressed polarization voltage and current. Therefore, if the potential of the reference and corroding electrodes is caused to be the same, the resulting current flow through the circuit including the corroding and auxiliary electrodes will represent the pitting index as distinguished from the general or average corrosion rate.

To state the second embodiment of the method in another manner, sufficient polarizing current is passed through the circuit including the corroding electrode C and the auxiliary electrode A to cause such electrode C to be polarized to the potential of reference electrode R. Such polarizing current is then noted, and is the pitting index. It is to be remembered that if there is no pitting tendency, the electrodes C and R will be at the same potential in the absence of any flow of polarizing current between C and A. On the other hand, if there is a high pitting tendency, the potential of C will be far from that of R. In the latter case, much polarizing current will be necessary to polarize C to the potential of R.

Also in accordance with the second embodiment of the method, the instantaneous general or average corrosion rate is determined after (not before) the pitting index is determined. This is accomplished by causing the reading on the microammeter which measured the pitting current (resulting from the method step described in the previous paragraph) to read zero despite the fact that the pitting current is still passing therethrough. Then, the potential of the corroding electrode C is caused to be 10 millivolts (or other desired predetermined voltage as set forth above relative to the first embodiment of the method) relative to the potential of the reference electrode R, and the current which is indicated by the needle or readout of the microammeter is again noted. This current represents only the general or average corrosion rate, because the pitting current has been compensated for.

In the described manner, therefore, both the pitting index and the general or average corrosion rate are determined without any reversal of the applied voltage, and without any need for any computation steps.

Stated more definitely, and with reference to the circuit illustrated in FIG. 6, the second embodiment of the method comprises closing the switch 34 to cause the lead 33 to connect amplifier input terminal 11 to lead 19 and thus to corroding electrode C. It is to be remembered that the differential amplifier 7 acts to cause the input terminals 11 and 12 to be at the same potential as each other, and that input terminal 12 is directly connected to reference electrode R through lead 16. It follows that when switch 34 is closed the reference electrode R and corroding electrode C will be forced to be at the same potential. The current which flows through microammeter 31 is noted and represents the pitting tendency or pitting index of the system.

The next step in the method is to employ the zero-set means 32, or other means, to cause the readout of microammeter 31 to be zero despite the fact that the pitting current is still flowing therethrough due to the fact that switch 34 is still closed. Switch 34 is then opened to break the circuit through lead 33, so that the corroding electrode C is forced to be 10 millivolts (or other predetermined potential) from reference electrode R due to the calibration of the circuit. The reading of microammeter 31 is then noted again, and is directly proportional to the general or average corrosion rate.

If the pitting current is in a positive (expected) direction, there is no problem. If the pitting current is negative, that is to say opposite to the expected direction based upon the impressed voltage, the terminals of the ammeter 31 are first reversed before the compensation is effected by zero-set circuit 32 or other means. There is no possibility that an operator will use the wrong sign, because all he needs to do is arrange the polarity such that the ammeter will read on scale (instead of backwards). He then compensates the ammeter as described, and proceeds to determine the general or average corrosion rate.

The circuit of FIG. 6 is calibrated as described relative to FIG. 5, with switch 34 open.

Because the reading of the microammeter scale is directly proportional to the general or average instantaneous corrosion rate, independently of the resistance of the system to which the electrodes A, C and R are exposed, the scale of ammeter 31 may be calibrated in terms of milli-inches of corrosion per year.

It is pointed out that the circuit of FIG. 6 may be associated with suitable control means. For example, the circuit may be caused to generate a steady reading indicating pitting tendency, and this reading (or output) may be associated with a control for an inhibitor pump, for example. The output of the circuit of FIG. 6 may also be associated with a control relative to the general or average corrosion rate, but means should be provided to effect periodic checks relative to the pitting tendency in order that the latter may be compensated for.

If desired, the reversing switch 9 of the circuit of FIG. 5 may also be incorporated in the circuit of FIG. 6. Although reversing is not necessary to the method, it may be employed to demonstrate to a customer or operator that the readings will be the same (in substantially all cases) regardless of the polarity of the applied voltage.

SUMMARY

In accordance with both the first and second embodiments of the invention, sufficient polarization current is passed between electrodes A and C to polarize C to a first predetermined potential relative to R. Thereafter, sufficient polarization current is passed between A and C to polarize C to a second predetermined potential relative to R, such second predetermined potential being different from the first-mentioned predetermined potential. The two polarization currents are employed to produce the general or average corrosion rate and the pitting tendency.

In the first embodiment (FIGS. 3, 4 and 5), the first and second predetermined potential are, respectively, plus and minus ΔE relative to the potential of R. As described above, ΔE is a predetermined small value (but substantially greater than zero) such as 10 or 20 millivolts. The corrosion rate and the pitting tendency are derived from the two polarization currents by computation (determining the average and difference).

In the second embodiment (FIG. 6), the first predetermined potential (relative to R) is zero (since C and R are caused to have the same potential value). The second predetermined potential is plus or minus ΔE. The polarization current employed to produce the first predetermined potential is the pitting tendency. The general or average corrosion rate is determined by nulling the ammeter to zero before passing the second-mentioned polarization current therethrough.

In both the first and second embodiments the order of the steps may be reversed. However, this produces the disadvantage, relative to the second embodiment, that computation steps are required, and the sign (direction) of the currents must be taken into account.

The foregoing detailed description is to be clearly understood as given by way of illustration and example only, the spirit and scope of this invention being limited solely by the appended claims.

I claim:

1. A method of determining both the general or average corrosion rate and the pitting tendency of a metal exposed to an electrolyte, which comprises:
   providing a corroding electrode formed of said metal,
   providing a reference electrode formed of said metal,
   providing an auxiliary electrode,
   immersing said corroding, reference and auxiliary electrodes in a body of said electrolyte,
   passing between said auxiliary and corroding electrodes sufficient polarization current to polarize said corroding electrode to a first predetermined potential relative to said reference electrode,
   said first predetermined potential being zero,
   passing between said auxiliary and corroding electrodes sufficient polarization current to polarize said corroding electrode to a second predetermined potential relative to said reference electrode,
   said second predetermined potential being substantially different from said first predetermined potential, and being a certain small number of millivolts substantially greater than zero, and
   employing said first-mentioned and second-mentioned polarization currents to produce both the general or average corrosion rate and the pitting tendency of said metal exposed to said electrolyte.

2. The invention as claimed in claim 1, in which said number is less than about 20.

3. The invention as claimed in claim 1, in which said first-mentioned polarization current is applied before application of said second-mentioned polarization current, in which a microammeter is employed to read said first-mentioned polarization current, and in which said method further comprises compensating said microammeter to zero while said first-mentioned polarization current is passing therethrough, and thereafter passing through said microammeter said second-mentioned polarization current, said first-mentioned polarization current being the pitting tendency, the current reading of the scale of said compensated microammeter while said second-mentioned polarization current is passing therethrough being directly proportional to the general or average corrosion rate.

4. A method of determining the instantaneous general or average rate of corrosion of a metal exposed to an electrolyte, and also determining the pitting tendency of said metal exposed to said electrolyte, which comprises:
   providing a corroding electrode formed of said metal the corrosion rate and pitting tendency of which are to be determined,
   providing a reference electrode also formed of said metal,
   providing an auxiliary electrode,
   exposing said three electrodes to a body of said electrolyte,
   providing external circuit means to connect said corroding electrode to said auxiliary electrode whereby a current may flow therebetween through a circuit including said electrolyte and said external circuit means,
   determining the amount of pitting current which flows through said circuit as the result of only the open circuit potential difference between said corroding electrode and said reference electrode,
   said current being the pitting tendency of said metal exposed to said electrolyte, impressing sufficient polarization voltage between said corroding electrode and said auxiliary electrode to cause the potential of said corroding electrode to be a predetermined small amount positive or negative relative to said reference electrode, and determining the amount of general or average corrosion current which flows through said circuit as the result of said impressed polarization voltage only, and not the result of said open circuit potential difference, said last-named amount of current being directly proportional to the instantaneous general or average corrosion rate of said metal exposed to said electrolyte, said steps of impressing said polarization voltage, and of determining the amounts of said currents, being performed by means of a differential amplifier and an ammeter.

5. A method of determining the corrosion characteristics of a metal exposed to an electrolyte, which comprises:

providing a corroding electrode and a reference electrode both formed of said metal, providing an auxiliary electrode, immersing said electrodes in a body of said electrolyte, passing sufficient polarizing current between said corroding and auxiliary electrodes to force the potential of said corroding electrode to be the same as the potential of said reference electrode, and measuring said polarizing current to thus determine the pitting tendency of said metal exposed to said electrolyte.

6. The invention as claimed in claim 5, in which said method further comprises passing between said corroding electrode and said auxiliary electrode sufficient polarizing current to cause the potential of said corroding electrode to be a predetermined small amount different from the potential of said reference electrode, determining the magnitude of said last-mentioned polarizing current, and subtracting from said last-mentioned polarizing current said first-mentioned polarizing current, the difference thus obtained being proportional to the general or average corrosion rate of said metal exposed to said electrolyte.

7. The invention as claimed in claim 6, in which said predetermined small amount is substantially greater than zero but less than about 20 millivolts.

8. The invention as claimed in claim 5, in which said polarizing current also flows through external circuit means which connects said auxiliary electrode to said corroding electrode, in which said measuring step is performed by an ammeter connected in said external circuit means, and in which said method further comprises compensating said ammeter to cause it to read zero despite the passage of said polarizing current therethrough, thereafter discontinuing said forcing step and passing through said external circuit means and through said electrolyte between said corroding electrode and said auxiliary electrode sufficient polarizing current to cause the potential of said corroding electrode to be a predetermined small amount different from that of said reference electrode, and thereafter reading said compensated ammeter to thus determine the general or average corrosion rate of said metal exposed to said electrolyte.

9. The invention as claimed in claim 8, in which said method further comprises passing said polarizing currents by means of a differential amplifier.

10. The invention as claimed in claim 9, in which said method further comprises connecting one input of said differential amplifier to a voltage source calibrated to produce said predetermined small potential difference between said corroding electrode and said reference electrode, connecting the other input of said differential amplifier to said reference electrode, connecting one output of said differential amplifier to said auxiliary electrode, connecting the other output of said differential amplifier to said corroding electrode, connecting said one input to said corroding electrode in order to effect said forcing step whereby the potential of said corroding electrode is caused to be the same as that of said reference electrode, thereafter reading said ammeter to determine the pitting tendency, thereafter causing said ammeter to read zero despite the passage of current therethrough, thereafter disconnecting said one input from said corroding electrode, and thereafter again reading said ammeter to determine the general or average corrosion rate.

11. A method of determining the instantaneous general or average rate of corrosion of a metal exposed to an electrolyte, and also determining the pitting tendency of said metal exposed to said electrolyte, which comprises:

providing a corroding electrode formed of said metal the corrosion rate and pitting tendency of which are to be determined, providing a reference electrode also formed of said metal, providing an auxiliary electrode, exposing said three electrodes to a body of said electrolyte, providing external circuit means to connect said corroding electrode to said auxiliary electrode whereby a current may flow therebetween through a circuit including said electrolyte and said external circuit means, determining the amount of pitting current which flows through said circuit as the result of only the open circuit potential difference between said corroding electrode and said reference electrode, said current being the pitting tendency of said metal exposed to said electrolyte, impressing sufficient polarization voltage between said corroding electrode and said auxiliary electrode to cause the potential of said corroding electrode to be a predetermined small amount positive or negative relative to said reference electrode, and determining the amount of general or average corrosion current which flows through said circuit as the result of said impressed polarization voltage only, and not the result of said open circuit potential difference, said last-named amount of current being directly proportional to the instantaneous general or average corrosion rate of said metal exposed to said electrolyte, said method further comprising effecting said determinations of the amounts of said pitting current and said general or average corrosion current by a. forcing said corroding electrode to be at the same potential as that of said reference electrode, b. determining the current which flows through said circuit when said corroding and reference electrodes are thus at the same potential, said current being said pitting current, and c. determining the amount of said general or average corrosion current by subtracting said pitting current from the current which flows through said circuit due to said impressing of sufficient polarization voltage between said corroding electrode and said auxiliary electrode to cause said corroding electrode to be said predetermined small amount positive or negative relative to said reference electrode.

12. The invention as claimed in claim 11, in which said subtracting is effected by reading said pitting current with an ammeter, thereafter causing said ammeter to read zero despite the passage of said pitting current therethrough, thereafter impressing said sufficient polarization voltage, and thereafter reading said ammeter to determine said general or average corrosion current.

13. Apparatus for determining the general or average corrosion rate, and the pitting tendency, of a metal exposed to an electrolyte, and without the necessity of correcting for the resistance of such electrolyte, which comprises:

means to mount a corroding electrode formed of said metal the corrosion rate and pitting tendency of which are to be determined, a reference electrode also formed of said metal, an auxiliary electrode, a differential amplifier, a source of D.C. voltage calibrated to produce a predetermined small potential difference between said corroding electrode and said reference electrode, means to connect one output of said source to one input terminal of said amplifier, means to connect the other input terminal of said amplifier to said reference electrode, means to connect one output terminal of said amplifier to said auxiliary electrode, means to connect the other output terminal of said amplifier to said corroding electrode, and means to determine the current flowing through said electrolyte between said auxiliary electrode and said corroding electrode.

14. The invention as claimed in claim 13, in which means are provided to connect said corroding electrode to the other output of said source of D.C. voltage.

15. The invention as claimed in claim 14, in which said auxiliary electrode is a metal sleeve, and in which said corroding electrode and said reference electrode are elongated electrodes the inner end portions of which are mounted in said sleeve in spaced and insulated relationship relative to each other and relative to said sleeve.

16. The invention as claimed in claim 14, in which means are provided to reverse the polarity of the D.C. voltage supplied to the input terminals of said amplifier by said voltage source.

17. The invention as claimed in claim 14, in which said current-determining means is an ammeter connected in circuit with either said auxiliary electrode or said corroding electrode.

18. The invention as claimed in claim 14, in which said current-determining means includes a resistor connected in circuit with either said auxiliary electrode or said corroding electrode, and in which storage and compute means are connected across said resistor.

19. The invention as claimed in claim 14, in which said current-determining means is an ammeter connected in circuit with either said auxiliary electrode or said corroding electrode, in which means are provided to cause said ammeter to read zero despite the flow of current therethrough, and in which circuit means are provided to connect said one input of said amplifier to said corroding electrode, said last-named circuit means incorporating a switch.

20. The invention as claimed in claim 14, in which said differential amplifier has a high gain and a high input impedance.

* * * * *